(12) United States Patent
Pruden

(10) Patent No.: US 8,596,872 B2
(45) Date of Patent: Dec. 3, 2013

(54) ROLLER BEARING SEAL

(75) Inventor: Jessica Pruden, Richmond, VA (US)

(73) Assignee: Amsted Rail Company, Inc., Chicago, IL (US)

(*) Notice: Subject to any disclaimer, the term of this patent is extended or adjusted under 35 U.S.C. 154(b) by 592 days.

(21) Appl. No.: 12/587,572

(22) Filed: Oct. 13, 2009

(65) Prior Publication Data

US 2011/0085755 A1   Apr. 14, 2011

(51) Int. Cl.
- F16C 33/80 (2006.01)
- F16C 33/76 (2006.01)
- F01D 11/02 (2006.01)
- F16J 15/32 (2006.01)

(52) U.S. Cl.
USPC ........... 384/480; 384/486; 277/351; 277/571; 277/572

(58) Field of Classification Search
USPC ......... 384/477, 480, 484, 485, 486, 487, 488; 277/351, 551, 562, 571, 572
See application file for complete search history.

(56) References Cited

U.S. PATENT DOCUMENTS

| | | | | |
|---|---|---|---|---|
| 3,341,265 | A | * | 9/1967 | Paterson ................... 384/486 |
| 4,819,949 | A | * | 4/1989 | Otto ......................... 277/351 |
| 4,958,942 | A | * | 9/1990 | Shimizu .................... 384/486 |
| 5,085,444 | A | * | 2/1992 | Murakami et al. ........... 277/503 |
| 5,186,472 | A | * | 2/1993 | Romero et al. ............ 277/351 |
| 5,211,406 | A | * | 5/1993 | Katzensteiner .............. 277/351 |
| 5,462,367 | A | * | 10/1995 | Davidson et al. ........... 384/459 |
| 5,890,812 | A | * | 4/1999 | Marcello et al. ............ 384/148 |
| 5,895,052 | A | * | 4/1999 | Drucktenhengst et al. ... 277/351 |
| 5,969,518 | A | * | 10/1999 | Merklein et al. ............ 324/173 |
| 7,314,219 | B1 | * | 1/2008 | Horvath et al. .............. 277/551 |
| 7,637,665 | B2 | * | 12/2009 | Cook ......................... 384/477 |
| 2005/0047693 | A1 | * | 3/2005 | Niebling et al. ............. 384/484 |
| 2005/0135717 | A1 | * | 6/2005 | Monetti et al. .............. 384/484 |
| 2007/0080503 | A1 | * | 4/2007 | Soda et al. .................. 277/551 |

* cited by examiner

*Primary Examiner* — Alan B Waits

(74) *Attorney, Agent, or Firm* — Edward J. Brosius

(57) ABSTRACT

A bearing assembly is presented having a novel bearing seal design that, in one embodiment, combines the sealing advantages of both a labyrinth-like seal in combination with a contact seal. The seal is held perpendicularly to the sealing surface, and in one embodiment, substantially divides the sealing forces equally between the lubricant seal portion and the dust seal portion of the seal by virtue of the symmetry of the seal geometry and the application of the resisting force substantially along the seal body's centerline. The seal departs from the cantilever geometry of prior art seal designs, and in one embodiment, provides an inherently stiffer seal.

8 Claims, 5 Drawing Sheets

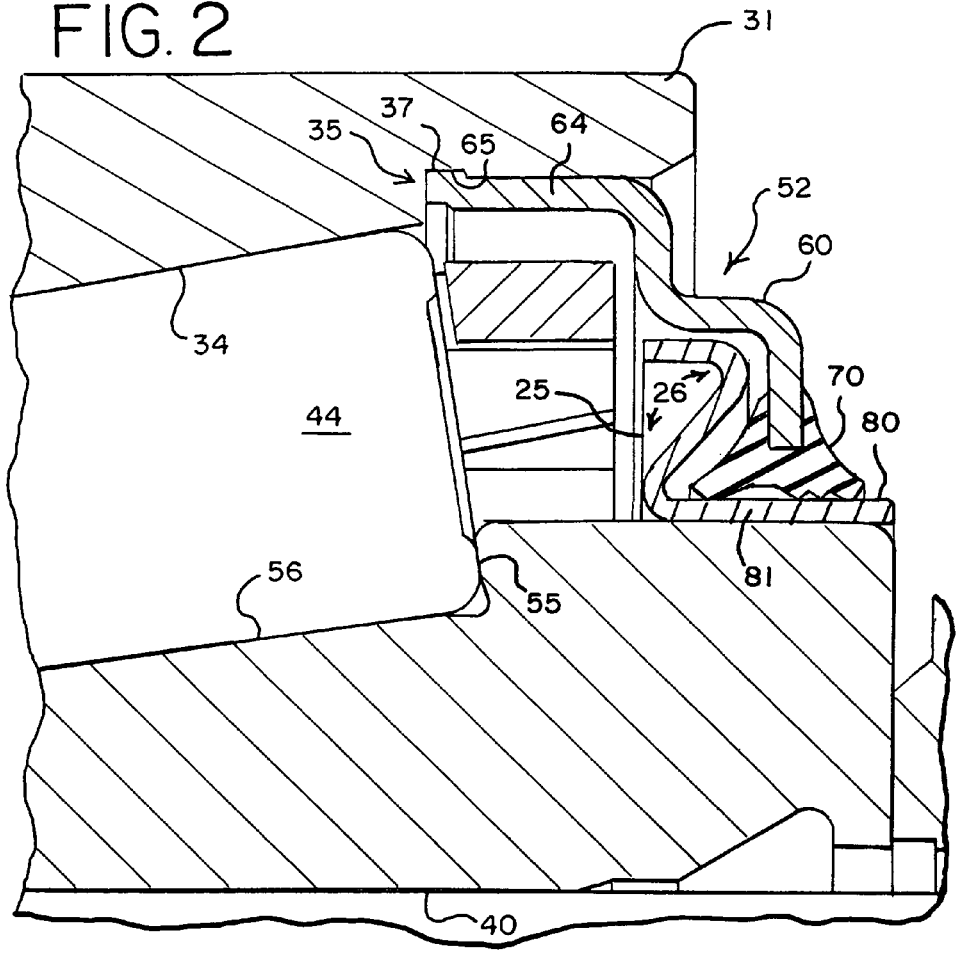
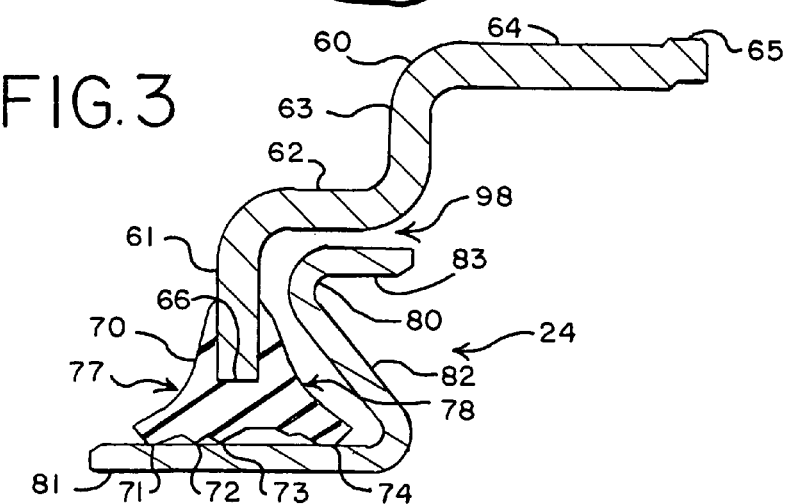

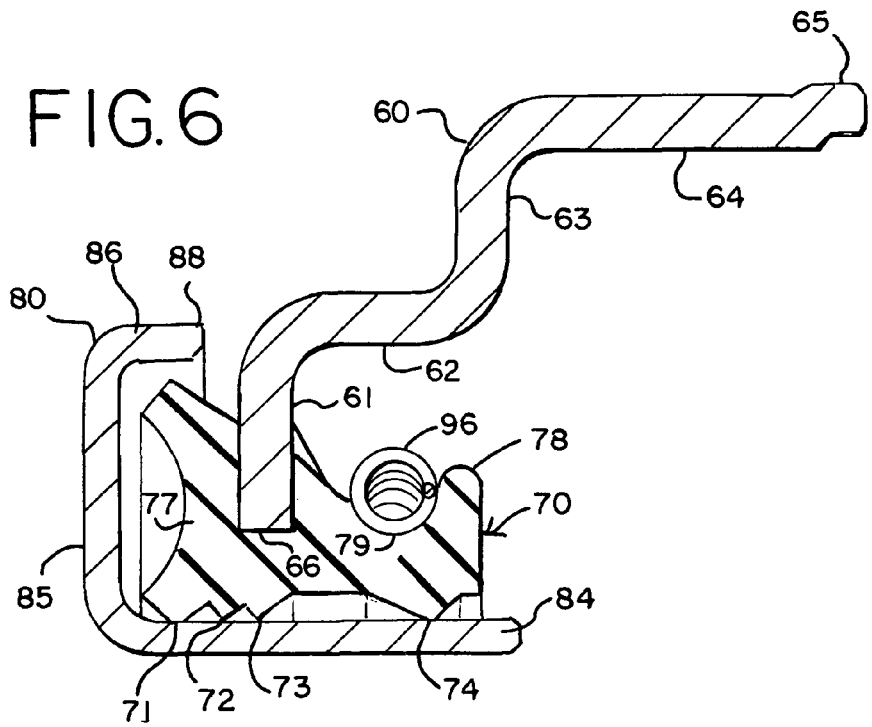
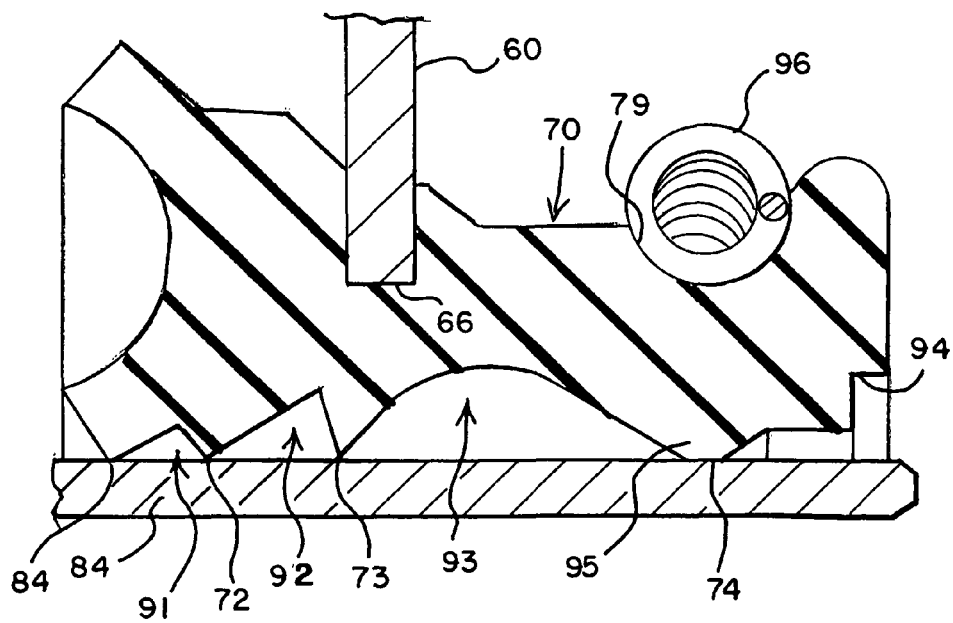

ROLLER BEARING SEAL

FIELD OF THE INVENTION

This invention relates to anti-friction bearings and more particularly, in one embodiment, to tapered roller bearings.

BACKGROUND OF THE INVENTION

Anti-friction bearings (also commonly known as rolling-contact bearings), such as ball bearings and tapered roller bearings, are commonly used in various industrial applications. Anti-friction bearings are typically purchased preassembled, ready for press fit onto the journal of a shaft or axle.

A lubricant (e.g., oil or grease) is applied to the bearing's rollers to minimize friction and wear. The quantity and quality of the lubricant have a significant effect on bearing life. Bearing service life can be extended with bearing end seals that minimize lubricant leakage and the intrusion of environmental contaminants.

End seals experience degradation in service because their elastomeric materials of construction are susceptible to the rubbing wear that such seals encounter. Reduction or loss of seal effectiveness accelerates lubricant loss, contaminant intrusion, and ultimately, accelerates bearing degradation and failure. An end seal design having a longer service life and a tighter seal over that service life can realize a significant reduction in the cost of preventive and corrective maintenance.

SUMMARY OF THE INVENTION

A bearing assembly is presented having a novel bearing end seal. The bearing end seal includes an outer seal case working in closely spaced cooperation with an inner seal case to establish two types of seals: (1) a running seal similar to a labyrinth type seal and (2) a contact or rubbing type seal.

In one embodiment, the outer seal case and inner seal case form a channel extending from the lubricated interior portion of the bearing (i.e., bearing cavity) to the exterior of the bearing. The channel allows for rotating and non-rotating bearing assembly components to move relative to each other while minimizing lubricant loss.

The outer seal case is a non-rotating component, affixed to a non-rotating portion of the bearing assembly such as the bearing cup. The inner seal case is affixed to the bearing cone and turns with the shaft. The inner seal case induces fluid shear in the lubricant disposed in the channel. The closely spaced and torturous path of the channel and the fluid shear imparted by the turning (i.e., rotating) inner seal case creates a labyrinth-like seal.

Any lubricant leakage in the channel that the labyrinth-like seal does not stop is further reduced with a contact type seal. In one embodiment, a resilient seal body is affixed to the outer seal case and urged against the inner seal case to substantially seal the interior of the bearing assembly from the exterior. In this embodiment, the resilient seal body extends from the outer seal case to perpendicularly contact the wear surface.

BRIEF DESCRIPTION OF THE FIGURES

Various embodiments of the bearing assembly are described and illustrated in the accompanying figures. The figures are provided as examples only and are not intended to be considered as limitations to the invention. Consequently, the bearing assembly is illustrated by way of example and not by limitation in the accompanying figures in which:

FIG. 2 is an enlarged sectional view of the exemplary first embodiment of FIG. 1;

FIG. 3 is a detailed sectional view of the end seal of the exemplary bearing assembly illustrated in FIG. 1 and FIG. 2;

FIG. 6 is a detailed sectional view of the end seal of the exemplary second embodiment illustrated in FIG. 4 and FIG. 5; and FIG. 7 is a detailed sectional view of the seal body for the exemplary second embodiment illustrated in FIG. 4, FIG. 5, and FIG. 6.

DETAILED DESCRIPTION

Figure 1:
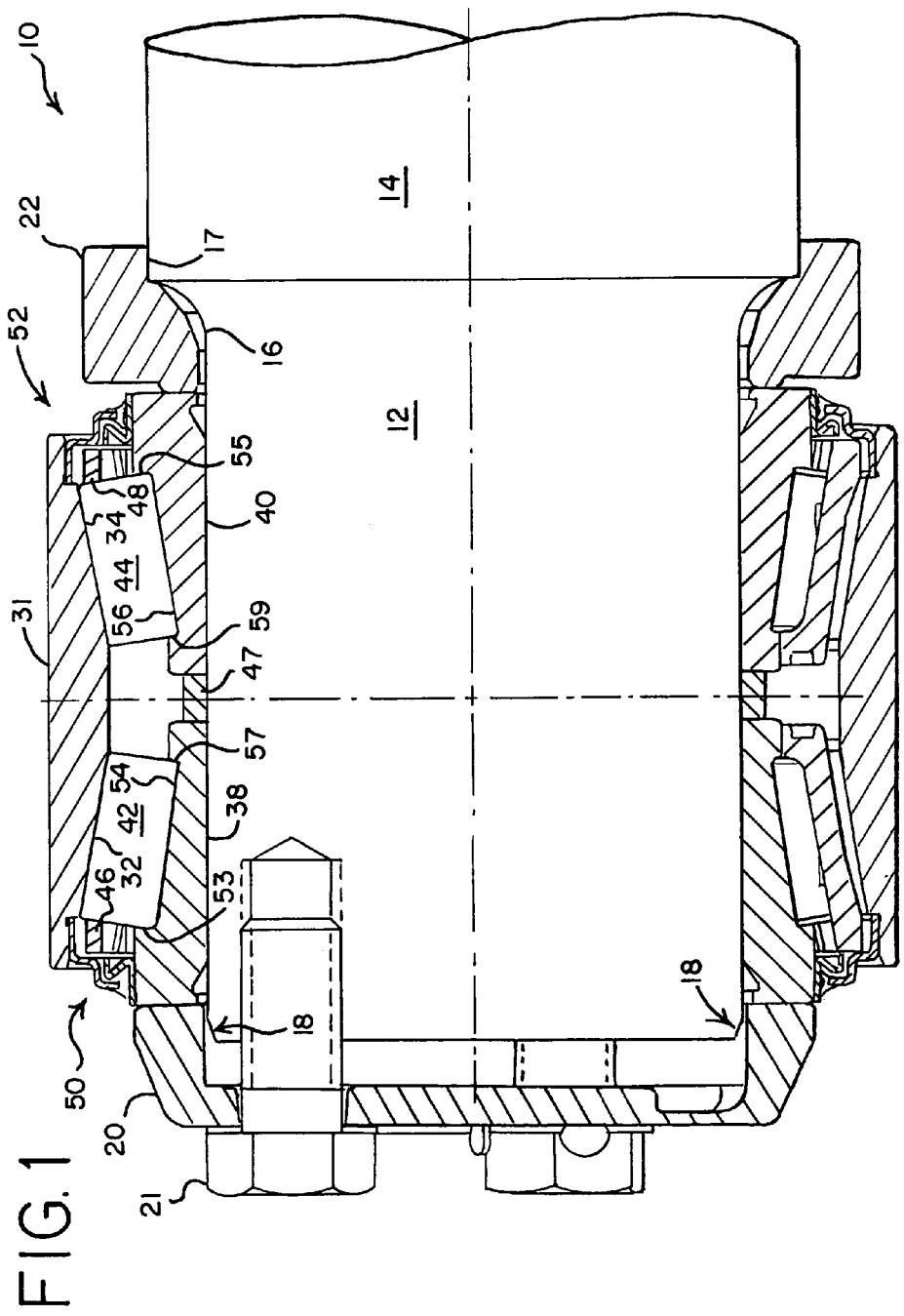
FIG. 1 is a sectional view of an exemplary first embodiment of the bearing assembly.

Referring to FIG. 1, an exemplary bearing assembly 10 is illustrated. In this first embodiment, the bearing assembly 10 is a tapered roller bearing assembly of the type commonly used in railway applications to support a low friction railcar wheel. The bearing assembly described in the following embodiments, however, may be adapted for use in many other common industrial applications. Consequently, the bearing assembly illustrated and described below in relation to a tapered roller bearing assembly for a railcar wheel is for convenience only. Furthermore, although the embodiments described and illustrated in the figures refer to tapered roller bearing assemblies, the novel bearing assembly described and claimed is generally applicable to anti-friction bearings.

The bearing assembly 10 is typically preassembled before being mounted on the journal 12 of a shaft 14 (e.g., a rail car axle). At the free end of the shaft 14, a journal 12 terminates in a slightly conical, tapered guide 18 to facilitate installation of the bearing assembly 10 onto the journal. The bearing assembly 10, in one embodiment, is press fit on the journal 12, which is machined to very close tolerances to accurately accommodate the press fit. The journal 12 terminates at its inner end in a contoured fillet 16 leading to a cylindrical shoulder 17 on the shaft 14. A backing ring 22 abuts the bearing assembly 10 and the shoulder 17, affixing the bearing assembly 10 against inboard axial displacement (i.e., inboard and outboard are relative to the center of the shaft along the shaft axis).

A bearing retaining cap 20, having a plurality of bores (not shown), is mounted at the free end of the shaft 14 with threaded cap screws or bolts 21. The bearing retaining cap 20 clamps the bearing assembly 10 into position on the shaft 14.

The bearing assembly 10 includes a unitary bearing cup 31 having a pair of adjacent outer raceways 32, 34 on the inner surface of the bearing cup (one adjacent at each end of the bearing cup) facing radially inward.

The bearing cones 38, 40 include cone back face ribs 53, 55 and cone front face ribs 57, 59 constraining the rollers 42, 44 and creating radially outward facing inner raceways 54, 56. The outer raceways 32, 34 in the bearing cup 31 cooperate with the inner raceways 54, 56 of bearing cones 38, 40, respectively, to capture and support two rows of the tapered rollers 42, 44.

A center spacer 47 is positioned between the bearing cones 38, 40 to maintain the cones in accurately spaced position relative to one another and allow for proper bearing lateral clearance. In some embodiments, a cage 46, 48 controls the spacing of the rollers 42, 44 to maintain their relative position between rollers.

End seals 50, 52 cover each end of the bearing assembly 10, and more specifically, the bearing cup and the bearing cones at each end of the bearing assembly. The end seals 50, 52 protect the bearing from contaminant intrusion and minimize lubricant leakage.

Referring now to FIG. 2, a detailed view of one embodiment of the end seals 50, 52 of FIG. 1 is illustrated. The end seals 50, 52 for both sides of the bearing assembly are the same and operate in the same manner. Consequently, FIG. 2 is representative of the end seal on either side of the bearing assembly and no further detailed discussion will be provided of the other end seal.

The end seal 52 includes an outer seal case 60 and an inner seal case 80. The outer seal case 60 and the inner seal case 80 work in a closely spaced relationship to exclude external contaminants and prevent lubricant leakage from the bearing assembly 10. The closely spaced, outer seal case 60 and inner seal case 80 form two types of seals: (1) a seal similar to a labyrinth type seal, and (2) a contact type seal.

The outer seal case 60 in one embodiment is affixed to the stationary (i.e., non-rotating) side of the bearing assembly 10 by interference fit or other appropriate method. For example, in this embodiment, the outer seal case 60 has a large diameter, outer cylindrical section 64 that attaches to the bearing cup 31. A retaining lip 65 on the outside surface of the outer cylindrical section 64 is adapted to snap into an undercut retaining groove 37 in the bearing cup 31. This design allows the outer seal case 60 to be releaseably retained on the bearing assembly 10. In another embodiment, the outer cylindrical section 64 may be press fit into the counterbore 35 of bearing cup 31.

The inner seal case 80 is affixed to the bearing cone 40 and rotates with the journal 12. In this embodiment, the inner seal case 80 has an inner cylindrical section 81 with an inner diameter dimensioned to provide an interference fit with the bearing cone 40 to allow the inner cylindrical section 81 to be press fit around the outer diameter of the cone.

The bearing assembly 10 is typically pre-lubricated prior to shipment by the manufacturer. The lubricant 25 most commonly used in the bearing assembly 10 is grease. During assembly, grease is typically applied to the rollers and to the seal body 70. The inner seal case 60 forms a lubricant reservoir 26 and may also be packed with grease. The lubricant reservoir 26 ensures adequate lubrication is supplied to the rollers and the surfaces contacting the rollers.

With an understanding of the general structure of the bearing assembly 10 and end seals 50, 52, the cooperative relationship between inner seal case 80 and the outer seal case 60 to minimize lubricant leakage and exclude foreign contaminants is discussed in detail below.

Referring to FIG. 3, an enlarged sectional view of the exemplary end seal 52 of FIG. 2 is illustrated. The outer seal case 60 has, in addition to the outer cylindrical section 64, a smaller diameter inner cylindrical section 62 running parallel to the outer cylindrical section 64. Connecting the outer cylindrical section 64 to the inner cylindrical section 62 is an outer circular section 63. Extending radially inward from the inner cylindrical section 62 and perpendicularly to the journal is an inner circular section 61. A seal body 70 is mounted at the distal end 66 of the inner circular section 61.

In one embodiment, the seal body 70 is molded on and permanently bonded to distal end 66. The seal body 70 extends radially inward, contacting the inner seal case 80. The inner seal case 80 provides a running surface for the seal body 70 to contact, creating a seal to exclude external contaminants and limit lubricant leakage. The wear surface created by the inner seal case 80 eliminates the need for wear rings commonly found in the prior art.

As described above, the inner cylindrical section 81 of the inner seal case 80 is press fit onto the outer diameter of the bearing cone. This inner cylindrical section 81 has a first end substantially flush with the cone back face and directed axially outward (i.e., axially outward and axially inward are relative to the bearing assembly center along the shaft axis).

The inner seal case 80 also has a larger diameter outer cylindrical section 83 extending parallel to the inner cylindrical section 81 and having a second end directed axially inward. An intermediate circular section 82 connects the inner cylindrical section 81 and the outer cylindrical section 83, extending obliquely from the inner cylindrical section 81, axially outward to the outer cylindrical section 83. The intermediate circular section 82 in conjunction with the outer cylindrical section 83 form an annular volume serving as an outboard lubricant reservoir 24 and directed axially inward.

One of the geometric relationships between the inner seal case 80 and the outer seal case 60 is that the inner circular section 61 of the outer seal case 60 is substantially perpendicular to the inner cylindrical section 81 of the inner seal case 80. This allows the seal body 70 to also be oriented substantially perpendicular to the inner cylindrical section 81.

The outer seal case 60 and the inner seal case 80 are closely spaced. The outer cylindrical section 83 of the inner seal case 80 is radially inward of the inner cylindrical section 62 of the outer seal case 60. The outer cylindrical section 83 of the inner seal case 80 is closely spaced to the inner cylindrical section 62 of the outer seal case 60. The intermediate circular section 82 extends axially inward of the inner circular section 61 of the outer seal case 60. The intermediate circular section 82 of the inner seal case 80 is closely spaced to the inner circular section 61 of the outer seal case 60 and to the complementary contour of the seal body 70 extending from the distal end 66.

The motion of the inner seal case 80 rotating with the shaft relative to the non-rotating outer case seal 60 creates a rotating side of channel 98 (the inner seal case side) and a stationary side of the channel (the outer seal case side). This relative motion induces shear stresses in the lubricant in the channel, impeding lubricant loss from the bearing assembly.

In this embodiment, the channel 98 is convoluted and forms a tortuous fluid flow path. The outer cylindrical section 83 and the intermediate circular section 82 of the inner seal case 80 form the inner seal case side of the channel 98. Closely spaced and cooperating with the inner seal case 80 is the outer seal case 60. The inner cylindrical section 62 and the inner circular section 61 of the outer seal case 60 form the outer seal case side of the channel 98.

Consequently, in one embodiment, the channel 98 begins with the closely spaced inner cylindrical section 62 of the outer seal case 60 and the outer cylindrical section 83 of the inner seal case 80. This portion of the channel 98, between the inner cylindrical section 62 of the outer seal case 60 and the outer cylindrical section 83 of the inner seal case 80, has a nominal clearance of 0.030 inches in one embodiment. The channel 98 continues between the inner circular section 61 of the outer seal case 60 and the intermediate circular section 82 of the inner seal case 80. The channel 98 further continues between the intermediate circular section 82 of the inner seal case 80 and the seal body 70. This portion of the channel 98, between the inner seal case 80 and the seal body 70, has a nominal clearance of 0.050 inches in one embodiment.

Because of the tortuous channel 98, lubricant flow is impeded as the flow path changes from axially outward to generally, axially inward, and then to axially outward again as the lubricant approaches the seal body. Any lubricant loss must then escape past the seal body 70.

In one embodiment, the seal body 70 typically is an integrally molded annular ring of elastomeric or rubber like material of suitable density and hardness selected for the particular application as is known in the art. For example, common materials of construction for the seal body 70 include Nitrile Butadiene Rubber (NBR), Viton, silicone, etc. The seal body 70, however, may be constructed of non-elastomeric materials (e.g., felt, thermoplastic and thermosetting polymers) or combinations of materials (e.g., a fabric reinforced elastomeric material).

Seals constructed from elastomeric materials are useful for providing a resilient seal. The resiliency of the seal body urges the seal body 70 against the cylindrical surface of the inner cylindrical section 81 to resist lubricant leakage. The seal body 70, in one embodiment, may have additional hydrodynamic elements and design features to enhance sealing capability.

For example, the seal body 70 is shown having a dust seal portion 77 and a lubricant seal portion 78. The dust seal portion 77 and lubricant seal portion 78 are substantially equally divided by an imaginary centerline through the center of inner circular section 61 of the outer seal case 60. The dust seal portion 77 has series of circumferential, radial inward projections forming a primary dust seal 71, a secondary dust seal 72, and an auxiliary dust seal 73. The lubricant seal portion has a lubricant seal extending axially inward to contact the inner cylindrical section 81.

The novel end seal presented allows the seal body 70 to exert a substantially equalized sealing force between the dust seal portion 77 and the lubricant seal portion 78 of the inner seal case 80. Because the inner circular section 61 of the outer seal case 60 extends substantially perpendicular to the inner cylindrical section 81 of the inner seal case 80, the seal body 70 allows the dust seal portion 77 and the lubricant seal portion 78 to exert substantially equal sealing pressure on the inner cylindrical section 81. Furthermore, the lubricant seal portion 78 and the dust seal portion 77, because of their perpendicular approach to the sealing surface (i.e., the cylindrical surface of the inner cylindrical section 81), can be designed inherently rigid to maximize sealing force and minimize flexure of the seal body 70.

As can be observed from FIG. 3, the imaginary centerline of the seal body 70 substantially divides the seal body 70 symmetrically between the dust seals on the axially outward side and the lubricant seal on the axially inward side of the inner circular section 61 of the outer seal case 60. The resisting force acting through the inner circular section 61 of the outer seal case 60 at the centerline of the seal body 70 produces substantially equal forces on the dust and lubricant seals due to the geometrical symmetry of the seal body 70 and the applied centerline force.

In contrast, the cantilevered seal body design typically found in prior art seal bodies has a dust seal at about the midway point of the cantilever and a lubricant seal toward the free end of the cantilever. As result, different forces are applied to the dust and lubricant seal depending on the distance the dust or lubricant seal is from the seal body mounting position (i.e., the fixed point of the cantilever). The sealing forces developed by the dust and lubricant seals of the seal body 70 may be more closely controlled in contrast to these prior art designs.

Furthermore, the seal body 70, because of its split body and extension into separate dust seal and lubricant seal portions, has a shorter, more compact seal body, providing greater rigidity to the dust seal portion 77 and the lubricant seal portion 78. This design reduces the deflection on each portion of the seal body, helping to maintain a constant sealing force on the surface of the inner cylindrical section 81 while in service.

However, if desired, to further increase the force on the seal body 70, a mechanical spring, such as an endless coil or garter spring may back the seal body. The spring is designed to maintain a continuous, controlled sealing pressure between the seal body and the inner seal case. An example of such a spring assembly is described in U.S. Pat. No. 5,186,548, entitled "Bearing Shaft Seal," granted Feb. 16, 1993, to Sink which is hereby incorporated by reference in its entirety.

Figure 4:
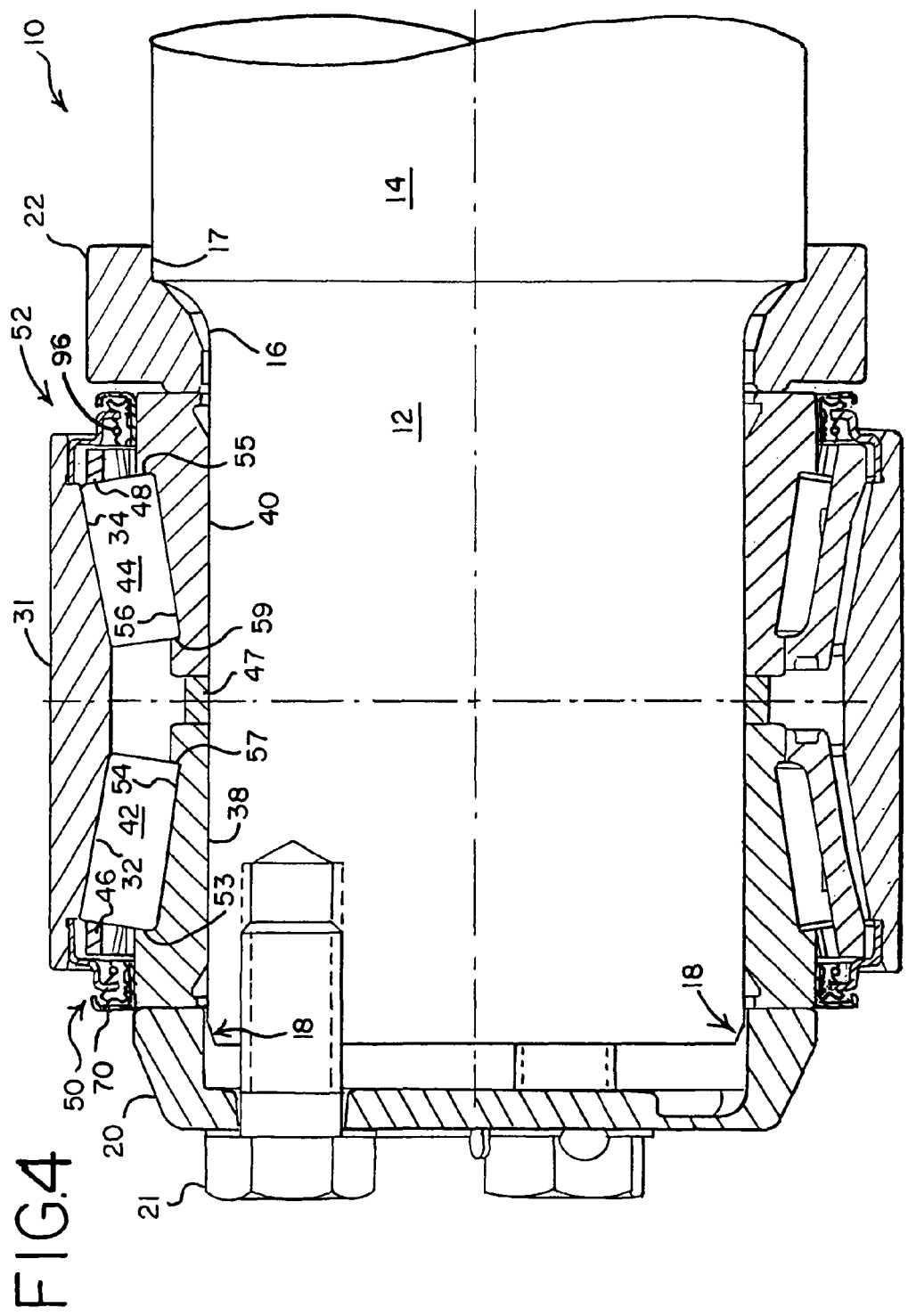
FIG. 4 is a sectional view of an exemplary second embodiment of the bearing assembly.

Referring to FIG. 4, an exemplary second embodiment of the end seal is illustrated. This second embodiment of the end seal has a spring 96 for increasing the sealing force on the seal body 70. Apart from the configuration of the end seals 50, 52, the bearing assembly 10 illustrated in FIG. 4 is the same as described and illustrated in FIG. 1.

Figure 5:
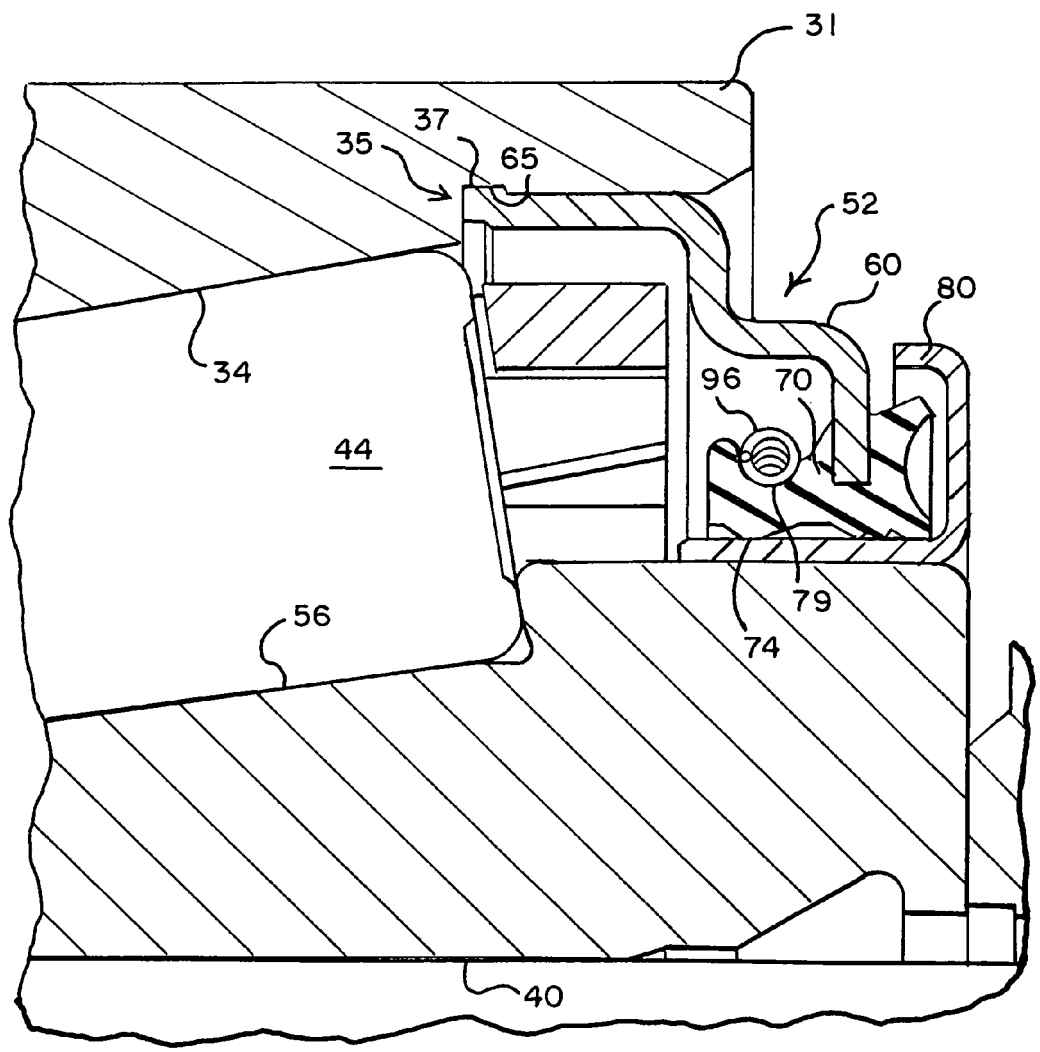
FIG. 5 is an enlarged sectional view of the exemplary second embodiment illustrated in FIG. 4.

Referring to FIG. 5, an enlarged detailed view of the second embodiment of the end seal 52 of FIG. 4 is illustrated. The end seals 50, 52 illustrated in FIG. 5 are similar to the end seals in FIG. 1 as both have an inner seal case and an outer seal case attached to the bearing cone 38, 40 and bearing cup 31 respectively.

One significant difference between this exemplary second embodiment and the first embodiment is the use of a spring 96 on the seal body 70 to exert greater sealing pressure on the inner seal case 80. In this second embodiment, a spring retaining groove 79, located circumferentially around the exterior surface of the seal body 70, captures the spring 96. This allows the spring 96 (e.g., a garter spring) to exert force on the seal body 70 and in particular, the lubricant seal 74.

Referring to FIG. 6, a detailed view of the exemplary, second embodiment end seal of FIG. 5 is illustrated. As can be seen by inspection in FIG. 6, the outer seal case 60 is identical to the first embodiment illustrated in FIG. 2. However, the inner seal case 80 has a substantially different design.

The inner seal case 80 has a substantially cylindrical shape. The inner seal case 80 has a first cylindrical section 84 with an inner diameter dimensioned to allow the first cylindrical section 84 to be press fit around the bearing cone. The first cylindrical section 84 starts with a first end that extends axially outward, ending substantially flush with the end of the bearing cone.

The inner case seal 80 also includes a larger diameter, second cylindrical section 86 having a free, second end 88 closely spaced to the outer seal case. The second cylindrical section and the first cylindrical section 84 are connected by a first circular section 85 disposed axially outward of the inner circular section 61 of the outer seal case 60. The inner seal case 80 substantially encloses the seal body 70, protecting it from external contaminants and shielding the elastomeric seal from physical abrasion.

Referring to FIG. 7, a detailed perspective view of the seal body 70 is illustrated for the end seal embodiment illustrated in FIGS. 3-6. In this embodiment, the seal body 70 has a lubricant seal 74 at one end of the seal body; and three dust seals at the other end of the seal body.

The lubricant seal 74, in one embodiment, is directed axially inward and is resiliently urged against the inner seal case to impede lubricant loss from the bearing assembly. Various designs may be incorporated into the lubricant seal 74 to enhance the seal's ability to minimize lubricant loss. This includes the use of hydrodynamic surfaces 94 located axially outward from the lubricant seal 74 and lubricant deflectors 95 axially inward of the lubricant seal 74. These lubricant seal designs are discussed in detail in U.S. Pat. No. 5,511,886, entitled "Bearing Seal with Oil Deflectors," granted Apr. 30, 1996, to Sink which is hereby incorporated by reference in its entirety.

The lubricant deflectors 95 are designed to minimize lubricant in the area axially inward and adjacent to the lubricant seal 74. Lubricant deflectors 95 are aligned circumferentially around the seal body 70 and extend radially inward. Like stationary impellers, the lubricant deflectors 95 force lubricant proximate the lubricant seal 74 back into the third annular chamber 93. Lubricant entrained by the inner seal case 80 impinges on the projecting lubricant deflectors 95 and is redirected back into annular chamber 93 from the lubricant seal 74, reducing lubricant leakage under the lubricant seal.

Similar to the lubricant deflectors 95, the hydrodynamic surfaces 94 are stationary and deflect lubricant back into bearing assembly 10. The hydrodynamic surfaces 94 are aligned circumferentially around the seal body 70, axially outward of the lubricant seal 74. Projecting radially inward, the hydrodynamic surfaces 94 present a curved surface facing axially inward. Lubricant entrained by the viscous shear forces imparted by the rotating wear ring impinges these hydrodynamic surfaces 94. The hydrodynamic surfaces 94 redirect the lubricant axially away from the lubricant seal 74 and into the bearing cavity.

In addition to the lubricant seal 74, the seal body 70 has a plurality of dust seals for minimizing contaminant intrusion into the bearing assembly. The first line of defense against external contaminants is the primary dust seal 71. The primary dust seal 71 is directed axially outward at the axially outward end of the seal body 70. The primary dust seal 71 is a contacting seal, extending and rubbing against the outer surface of the first cylindrical section 84 of the inner seal case.

Immediately adjacent and axially inward of the primary dust seal 71 is the axially outwardly directed, secondary dust seal 72. The secondary dust seal 72 may either contact or is closely spaced to the first cylindrical section 84. The primary dust seal 71 and the secondary dust seal 72 operate in conjunction to exclude contaminants from the bearing assembly.

Axially inward of the secondary dust seal 72 is the auxiliary dust seal 73. In one embodiment, the auxiliary dust seal 73 is a closely spaced, non-contacting seal. In another embodiment, however, the auxiliary dust seal 73, may contact the first cylindrical section 84. The auxiliary dust seal 73 is available to impede particulate contaminants escaping the secondary dust seal 72.

The effectiveness of the dust seal arrangement is further augmented by annular chambers formed between the dust seals and lubricant seals. The first annular chamber 91 is formed between the primary dust seal 71 and the secondary dust seal 72. Similarly, a second annular chamber 92 is formed between the secondary dust seal 72 and the auxiliary dust seal 73. Finally, a third annular chamber 93 is formed between the auxiliary dust seal 73 the lubricant seal 74.

In addition to the barrier created by the dust seals, the lubricant in the annular chambers pins contaminants and impedes contaminant migration. The annular chambers are typically pre-packed with a suitable lubricant (e.g., grease). Contaminants entering the bearing assembly are blocked by the physical presence of the lubricant. In addition, the grease acts as a pinning agent to entrap and impede the further migration of contaminants.

Although the above description for the seal body dust seals and lubricant seal, as well as the hydrodynamic surfaces and lubricant deflectors are all specific to the seal body 70 of the second embodiment as illustrated in FIGS. 4-6, these design features can be implemented on the seal body 70 of the first embodiment illustrated in FIGS. 1-3.

While the invention has been illustrated with respect to several specific embodiments, these embodiments are illustrative rather than limiting. Various modifications and additions could be made to each of these embodiments as will be apparent to those skilled in the art. Accordingly, the invention should not be limited by the above description or of the specific embodiments provided as examples. Rather, the invention should be defined only by the following claims.

The invention claimed is:

1. A bearing assembly affixed to a shaft, the shaft having a shoulder spaced from a free end, a journal of smaller diameter than the shaft between the shoulder and the free end, and a fillet leading from the journal to the shoulder, the bearing assembly comprising:
 a bearing cup having a radially inward directed outer raceway;
 a bearing cone affixed to the journal, the bearing cone having a radially outward directed inner raceway;
 a plurality of rollers captured between the outer raceway of the bearing cup and the inner raceway of the bearing cone;
 an inner seal case having:
  an inner cylindrical section of the inner seal case affixed to the bearing cone;
  an outer cylindrical section of the inner seal case in parallel with the inner cylindrical section of the inner seal case; and
  an intermediate circular section of the inner seal case extending radially outward at an oblique angle from the inner cylindrical section of the inner seal case; and
 an outer seal case having:
  an outer cylindrical section of the outer case affixed to the bearing cup;
  an inner cylindrical section of the outer seal case in parallel with the outer cylindrical section of the outer seal case;
  an outer circular section of the outer seal case connecting the outer cylindrical section of the outer seal case with the inner cylindrical section of the outer seal case; and
  an inner circular section of the outer seal case extending substantially perpendicularly from the inner cylindrical section of the outer seal case; and
 a seal body affixed to the inner circular section of the outer seal case, the seal body extending substantially perpendicularly to the inner cylindrical section of the inner seal case;
 wherein the outer cylindrical section of the inner seal case is radially inward of the inner cylindrical section of the outer seal case and
 wherein the intermediate circular section of the inner seal case is axially inward and in spaced cooperation with the inner circular section of the outer seal case to form a channel.

2. The bearing assembly of claim 1, wherein the seal body comprises:
 a dust seal portion; and
 a lubricant seal portion;
 wherein the lubricant seal portion extends axially inward and the dust seal portion extends axially outward.

3. The bearing assembly of claim 2, wherein the dust seal portion further comprises:
 a primary dust seal;
 a secondary dust seal disposed axially inward from the primary dust seal; and an auxiliary dust seal disposed axially inward of the secondary dust seal;
wherein the primary dust seal, secondary dust seal, and auxiliary dust seal extend radially inward from the dust seal portion to contact the inner cylindrical section of the inner seal case.

4. The bearing assembly of claim 2, wherein the lubricant seal portion further comprises a lubricant seal extending radially inward to contact the inner cylindrical section of the inner seal case.

5. The bearing assembly of claim 4, wherein the lubricant sealing portion further comprises a plurality of lubricant deflectors disposed axially inward of the lubricant seal.

6. The bearing assembly of claim 4, wherein the lubricant sealing portion further comprises a plurality of hydrodynamic surfaces disposed axially outward of the lubricant seal.

7. The bearing assembly of claim 1, further comprising:
a backing ring affixed around the fillet to affix the bearing assembly against axially inward displacement; and
a bearing retaining cap affixed to the shaft free end to affix the bearing assembly against axially outward displacement.

8. The bearing assembly of claim 7, further comprising a cage to separate the plurality of rollers.

* * * * *